United States Patent

Barth et al.

[11] Patent Number: 4,591,758
[45] Date of Patent: May 27, 1986

[54] GAS PLASMA DISPLAY PANEL CONTAINING AN IMPROVED LOW-TEMPERATURE DIELECTRIC

[75] Inventors: Edward G. Barth, Union; Ruvim Braude, Elizabeth; Nicholas W. Kay, Mine Hill, all of N.J.

[73] Assignee: Burroughs Corporation, Detroit, Mich.

[21] Appl. No.: 701,609

[22] Filed: Feb. 14, 1985

Related U.S. Application Data

[62] Division of Ser. No. 506,813, Jun. 22, 1983, Pat. No. 4,547,467.

[51] Int. Cl.[4] .......................... H01J 17/00; C03C 3/12
[52] U.S. Cl. ..................................... 313/518; 313/519; 501/20

[58] Field of Search .............. 428/206, 207, 208, 325, 428/331; 252/62.3 R, 62.3 V, 570, 572, 573, 574; 501/17, 19, 20, 21, 73, 26, 77, 79; 313/509, 586, 518, 519; 106/20

[56] References Cited

U.S. PATENT DOCUMENTS

| 3,931,436 | 1/1976 | Kupsky | 313/518 X |
| 4,369,254 | 1/1983 | Prabhu et al. | 501/21 |
| 4,392,180 | 7/1983 | Nair | 501/20 X |
| 4,446,059 | 5/1984 | Eustice | 252/514 |

Primary Examiner—David K. Moore
Assistant Examiner—K. Wieder
Attorney, Agent, or Firm—Robert A. Green; Mark T. Starr; Kevin R. Peterson

[57] ABSTRACT

A composition for a dielectric ink used in a screening process including a lead-free glass frit binder, silica, and a vehicle. The dielectric composition is particularly suited for use in gas plasma display panels.

1 Claim, 2 Drawing Figures

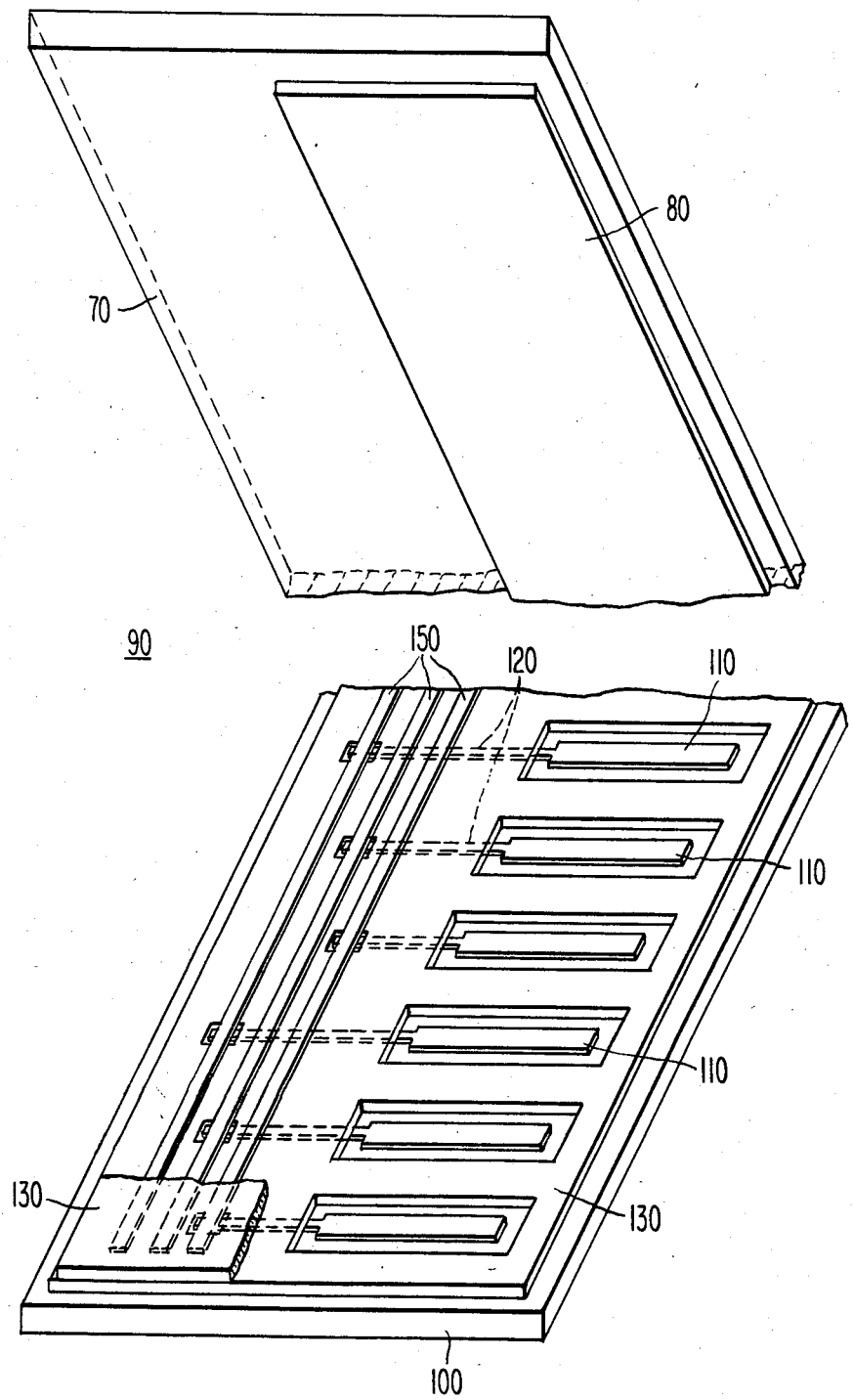

GAS PLASMA DISPLAY PANEL CONTAINING AN IMPROVED LOW-TEMPERATURE DIELECTRIC

This is a division of application Ser. No. 506,813, filed June 22, 1983, now U.S. Pat. No. 4,547,467.

BACKGROUND OF THE INVENTION

Many types of gas-plasma display devices are now in wide use. All of these devices include electrodes, electrode leads and various forms of dielectric layers. The dielectric layers perform several functions including providing an undercoating for electrodes, insulating electrodes from each other, covering conductor runs, and the like. These dielectric layers are formed by depositing a dielectric composition on a soda-lime glass plate and then firing to form the desired layer.

These dielectric compositions generally consist of a glass frit, one or more refractory fillers, an inorganic pigment and an organic vehicle. Such compositions are usually referred to as pastes or inks. In using such materials, various factors including optical, physical and electrical characteristics must be taken into account; and, in selecting the glasses for these dielectrics, the primary factors to consider are the thermal coefficient of expansion and softening and working temperatures.

Up to the present time, glasses suitable for use in various types of display panels employing sodalime float glass as the preferred substrate material have all included lead. Only lead glasses were found capable of achieving the required characteristics, including a working temperature below 590° C., which is necessary to prevent distortion of the glass substrate. As is well known, lead is an undesirable element to have present in the manufacturing process. These lead glasses are degraded by thermal processing during fabrication operations and by high electric fields such as those encountered during device operation. In addition, the use of lead-bearing glasses presents a potential environmental and personnel health problem, and complex and expensive protective measures are required to alleviate these problems.

The present invention provides a new dielectric composition which includes a lead-free glass frit and is usable in display panels and the like devices. This composition is formulated to provide a multilayer dielectric coating to isolate layers of conductor runs and a mask dielectric coating to provide a low-cost glass, black insulation layer between conductor runs and the gas plasma.

DESCRIPTION OF THE DRAWINGS

FIG. 2 is a perspective view of a portion of another type of display panel which can use the dielectric composition of the invention.

DESCRIPTION OF THE INVENTION

Figure 1:
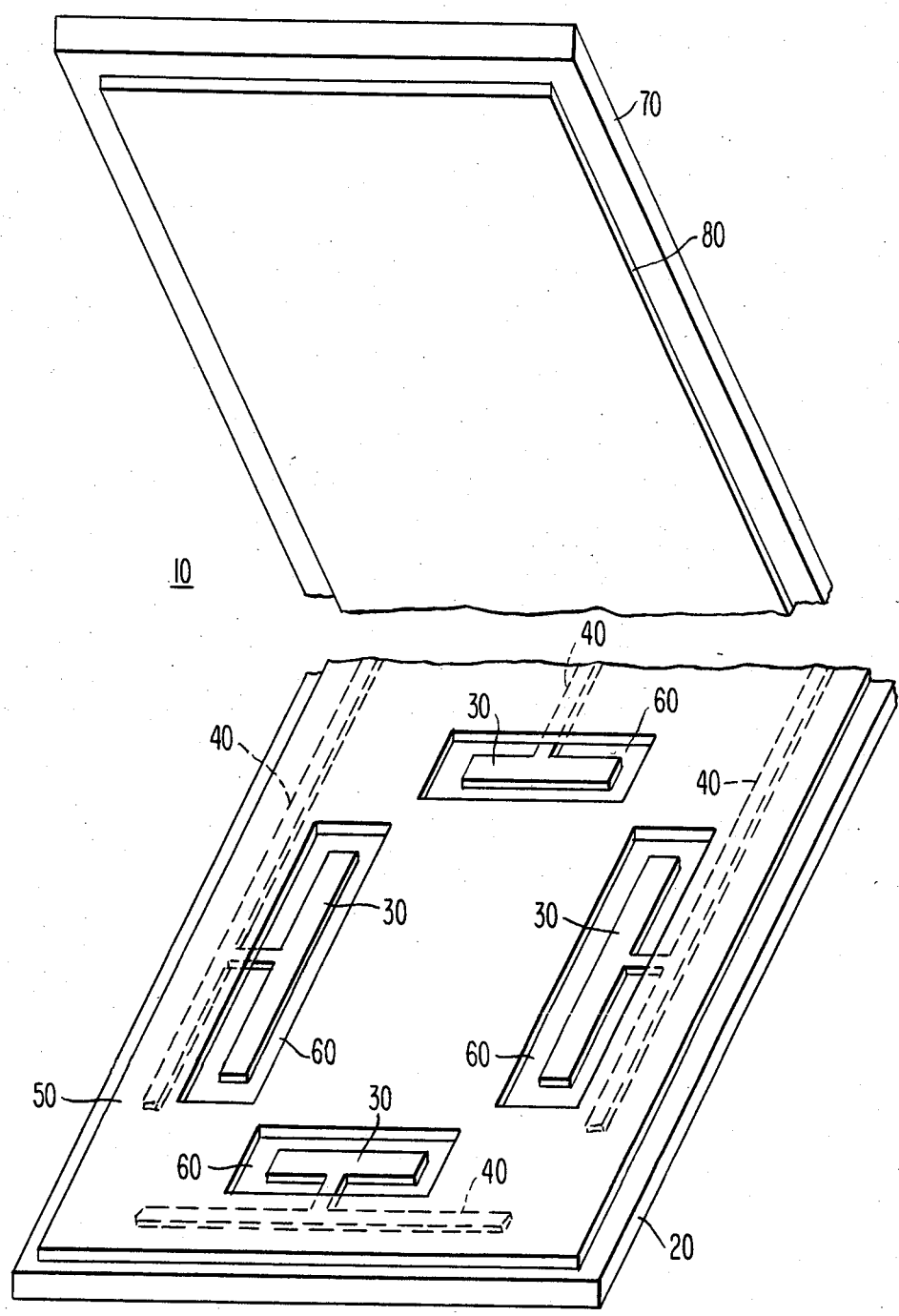
FIG. 1. is a perspective view of a portion of one type of display panel which can use the dielectric composition of the invention.

The dielectric composition of the invention can be used in many different types of display devices and in different ways in such devices. These devices include gas plasma display devices of the type known as PANAPLEX panels, bar graphs, SELF SCAN panels, SELF-SCAN memory panels, etc.

A portion of a segment panel 10 shown in FIG. 1 includes a glass base plate 20, usually of soda-lime glass, on which a plurality of glow cathode electrodes 30 and their conductor runs 40 are screened using a conductor ink. A layer 50 of a dielectric composition embodying the invention is screened over the cathodes and their runs, with openings 60 provided around the cathodes. The panel face plate 70 carries at least one transparent conductive anode 80 for and overlying the cathodes. Other features included in these panels are not shown in FIG. 1, but are well known to those skilled in the art. Panels of this type are shown in U.S. Pat. No. 3,720,452, dated Mar. 13, 1973, of George A. Kupsky which is incorporated herein by reference.

A portion of a bar graph 90 is shown in FIG. 2, and this device includes a glass base plate 100, on which a series of cathode bars 110 are screened along with a plurality of conductor runs 120 extending along the series of cathodes parallel to each other. One or more dielectric layers 130, made with the composition of the invention, are provided on the base plate outlining the cathodes and having vias 140 over the conductor runs, with conductors 150 connecting selected cathodes through the proper vias to the same conductor run 120 so that the cathodes are connected in groups. One or more of the dielectric layers 130 cover these connecting conductors also and outline the cathode elements. The bar graph includes a face plate and suitable transparent anode as shown in FIG. 1. Bar graphs are shown in U.S. Pat. No. 3,973,166, dated Aug. 3, 1976, of Thomas C. Maloney which is incorporated herein by reference.

The dielectric composition of the invention includes the following components in the weight percent quantities indicated:

|  | Component | Optimum Complete Composition | Composition of Fractions Optimum | Usable Range |
|---|---|---|---|---|
| Inorganic Fraction | Non-lead glass frit | 34.00 | 45.3 | 30–60 |
|  | Silica I | 17.00 | 22.7 | 15–40 |
|  | Silica II | 1.00 | 1.3 | 0–3 |
|  | F-3786 Pigment | 23.00 | 30.7 | 15–40 |
|  |  |  | 100.0 |  |
| Vehicle Fraction | Ethylcellulose | 0.70 | 2.80 |  |
|  | Alpha Terpineol | 24.20 | 96.80 |  |
|  | CO 430 | 0.09 | 0.36 |  |
|  | Amine-T | 0.01 | 0.04 |  |
|  |  |  | 100.0 |  |

Silica I is an amorphous silica which has a particle size of about ten microns and is used as a major refractory filler component. One commercial form of this component is IMSIL A-10 of Whittaker, Clark and Daniels, Inc. The silica II is produced by the arc process and has a particle size of about 0.2 to about one micron and is used to modify the structure of the ink and the fired dielectric. This silica is sold by Cabot Corporation.

The F-3786 is an iron chromite black spinel, Fe(FeCr)$_2$O$_4$, having a particle size of about 3 to 5 microns and is made by Ferro Corporation. This pigment has been found to be especially resistant to the effects of a gas plasma environment. Alternative pigments may be used for other applications.

In the vehicle, CO 430 made by GAF Corporation and the amine-T made by Ciba-Geigy Corporation are surfactants which are used to achieve the rheological properties necessary for thick film screen printing.

The optimum and usable ranges for the components of the inorganic fraction are shown above. Wide variations in both vehicle formulation and the proportions of inorganic to vehicle fractions can be employed to optimize the final ink composition for an intended application.

The glass frit is prepared from the lead-free glass described and claimed in an application entitled "GLASS COMPOSITION AND GAS-FILLED DISPLAY PANEL INCORPORATING THE GLASS", filed concurrently herewith, by Ruvim Braude. This lead-free glass has a thermal coefficient of expansion which closely matches that of soda-lime glass and has a dielectric constant of about 12. This glass is also optically clear when fired on a soda-lime glass base plate. In addition, the glass can withstand sealing temperatures up to 490° C. without significant softening and can be fired below 600° C. to prevent distortion of the soda-lime base plate.

The glass includes the following components in the quantities indicated:

| Component | Weight Percent | |
| --- | --- | --- |
| | Optimum | Usable Range Variation |
| $SiO_2$ | 20 | ±6 |
| ZnO | 40 | ±6 |
| $B_2O_3$ | 20 | ±5 |
| $Al_2O_3$ | 5 | 1-6 |
| $Na_2O$ | 7 | 2-10 |
| $K_2O$ | 4 | 0-6 |
| CaO | 3 | 1-5 |
| $Li_2O$ | 1 | 0-2 |

In preparing the glass, the various components are melted in a platinum crucible furnace at a temperature of about 1100° C. and maintained at that temperature for approximately four hours. Conventional grinding operations are used to reduce the glass to a frit particle size of about five microns.

The method of preparing the dielectric for use is not critical and may be carried out by conventional thick film milling, mixing and 3-roll mill high shear blending of the components shown above.

This paste composition can be optimized for a specific application method by utilizing formulation techniques and materials which are well known throughout the thick film ink manufacturing industry.

For fabricating the dielectric layers in the devices shown, the dielectric paste can be applied by thick film screen printing, doctor blading, or by any other suitable application methods.

The dielectric of the invention has the advantage that, even though it is lead-free, a dielectric coating which possesses all the optical, mechanical and electrical characteristics required for the described display panel can be formed at temperatures below 580° C. It also shows no adverse reaction with any of the components of panel 10 or any of the processing procedures normally employed in the preparation of a gas-filled display panel. In particular, reducing atmospheres can be more effectively utilized with this non-reactive dielectric. The service life of devices utilizing this dielectric will also be increased since the degradation mechanisms inherent in lead glass dielectric compositions, which are accelerated by the elevated operating temperatures, high electric fields, and the gas plasma environment, are not present.

We claim:

1. A gas plasma display panel including
   an envelope made up of a base plate and a face plate containing an ionizable gas,
   a plurality of thick film cathode electrodes in said envelope,
   at least one anode electrode in operative relation with said cathode electrodes, and
   a dielectric on said base plate and outlining said cathodes, said dielectric comprising a composition including a lead-free glass frit, silica, and a vehicle,
   said glass composition including about 20% by weight of $SiO_2$, about 20% by weight of $B_2O_3$, about 3% by weight of CaO, about 40% by weight of ZnO, about 5% by weight of $Al_2O_3$, about 7% by weight of $Na_2O$, about 4% by weight of $K_2O$, and about 1% by weight of $Li_2O$,
   said glass composition being fireable at temperature below about 600° C.

* * * * *